(12) United States Patent
Lichtenhan et al.

(10) Patent No.: US 6,362,279 B2
(45) Date of Patent: *Mar. 26, 2002

(54) PRECERAMIC ADDITIVES AS FIRE RETARDANTS FOR PLASTICS

(75) Inventors: Joseph D. Lichtenhan, Fountain Valley, CA (US); Jeffrey W. Gilman, Mt. Airy, MD (US)

(73) Assignee: The United States of America as represented by the Secretary of the Air Force, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,357

(22) Filed: Dec. 18, 1998

Related U.S. Application Data

(63) Continuation-in-part of application No. 08/864,516, filed on May 28, 1997, now abandoned.
(60) Provisional application No. 60/026,783, filed on Sep. 27, 1996.

(51) Int. Cl.⁷ .................................................. C08F 8/00
(52) U.S. Cl. ........................ 525/105; 524/588; 525/431; 525/436; 525/474; 525/479
(58) Field of Search .......................... 524/588; 525/926, 525/105, 431, 436, 474, 479; 428/383; 174/110 S

(56) References Cited

U.S. PATENT DOCUMENTS

| | | | | |
|---|---|---|---|---|
| 4,220,600 A | * | 9/1980 | Yajima et al. | 556/434 |
| 5,089,552 A | * | 2/1992 | Myers | 525/393 |
| 5,260,377 A | * | 11/1993 | Weber et al. | 525/105 |
| 5,420,238 A | * | 5/1995 | Ito et al. | 528/481 |
| 5,484,867 A | * | 1/1996 | Lichtenhan et al. | 528/474 |
| 5,616,650 A | * | 4/1997 | Becker et al. | 525/102 |
| 5,639,844 A | * | 6/1997 | Blum et al. | 528/16 |
| 5,776,764 A | * | 7/1998 | Ueta et al. | 430/326 |
| 5,807,954 A | * | 9/1998 | Becker et al. | 528/25 |
| 5,858,544 A | * | 1/1999 | Holl et al. | 528/31 |
| 5,907,019 A | * | 5/1999 | Itoh et al. | 525/477 |
| 5,981,670 A | * | 11/1999 | Itoh et al. | 525/478 |
| 6,005,036 A | * | 12/1999 | Carrozza et al. | 528/31 |

* cited by examiner

Primary Examiner—Veronica P. Hoke
(74) Attorney, Agent, or Firm—Thomas C. Stover

(57) ABSTRACT

An ecological fire retardant blend of thermoplastics is provided. That is, to one or more organic polymers is added one or more preceramic oligomers or preceramic polymers to provide a blend of polymers of reduced flammability which do not significantly increase the levels of smoke, carbon monoxide or other toxics during combustion. In one example a preceramic polymer, eg. a polysilane resin is added to a polyolefin to provide an ecological fire retardant blend per the invention.

15 Claims, 4 Drawing Sheets

US 6,362,279 B2

PRECERAMIC ADDITIVES AS FIRE RETARDANTS FOR PLASTICS

CROSS REFERENCE TO RELATED PATENT APPLICATIONS

This application is a Continuation-in-Part of prior application Ser. No. 08/864,516 of the same title, filed in the USPTO on May 28, 1997 now abandoned in turn, based on a provisional application filed in the US PTO on Sep. 27, 1996, as Ser. No. 60/026,783.

STATEMENT OF GOVERNMENT INTEREST

The invention described herein may be manufactured and used by or for the Government for governmental purposes without the payment of any royalty thereon.

FIELD OF THE INVENTION

This invention relates to fire retardants for plastics particularly preceramic additives as fire retardants for plastics and fire retardant blends of such additives and plastics.

BACKGROUND OF THE INVENTION

Current fire retardants have a number of problems depending on the system. Halogen based fire retardants (which may produce toxic and corrosive combustion products) and phosphorus based fire retardants increase the amount of carbon monoxide and smoke during combustion (by five to ten times), hydrates (e.g. ATH, aluminum trihydrate) which decompose by an endothermic process to produce water, must be used at such high loadings that (40–70% wt) the physical properties of the base polymer are excessively compromised. New fire retardants are needed that do not have these shortcomings. This is especially important for US companies trying to sell products in Europe, where a negative public opinion exists towards halogen base fire retardants, and a new European environmental law, the "eco-labeling" law, has passed which requires a label on all products that describes the materials used in the product. These issues are forcing companies to look for new, environmentally acceptable fire retardants for their fire retardant (FR) polymer products.

Accordingly there is need and market for fire retardants for plastics including polymers, which overcome the above prior art shortcomings.

There have now been discovered FR additives for polymers and FR blends of additives and polymers which are effective as such FRs and are environmentally suitable or safe.

SUMMARY OF THE INVENTION

Broadly the present invention provides an environmentally friendly (eco) FR for plastics comprising preceramic polymers.

The invention also includes combining such preceramic polymers with plastics as additives and in blends therewith to form eco FR materials.

Such preceramic polymers can be present in the blend in the amount of 1–80 wt% as discussed below.

The invention also provides a method for enhancing the fire resistivity of plastics by adding at least one preceramic polymer to at least one organic plastic to reduce the flammability thereof and form a polymer-plastic blend, wherein the preceramic polymer is selected from the group of polycarbosilanes (PCS), polysilanes (PS), polysilsesquioxane (PSS) resins and polyhedral oligomeric silsesquioxane (POSS) monomers, polymers and copolymers.

Definitions:

By "preceramic polymer" as used herein, is meant an oligomeric or polymeric material that converts into a ceramic (inorganic char,) when heated above its decomposition point. Listed below are several examples of different types of preceramic oligomers and polymers.

By "oligomer" as used herein, is meant low molecular weight polymer chains that are often unentangled and which do not show the same level of desirable mechanical properties as higher molecular weight chains of the same polymer.

By "engineering polymer" as used herein, is meant a thermoset plastic or thermoplastic that maintains its dimensional stability and most of its mechanical properties between –20° C. to 200° C. Generically these resins include: acetals, polyamides (nylons), polyimides, polyetherimides, polyesters, polycarbonates, polyethers, polysulfides, polysulfones and blends or alloys of them.

By "commodity polymer" as used herein, is meant a thermoplastic or thermoset plastic that maintains most of its mechanical properties between 0 to 100° C. Typically such polymers are called commodity plastics because they are also produced on a large scale industrially and hence often cost less per pound than the above mentioned engineering polymers. Examples include: styrenics, acrylics, polyolefins, polyurethanes, polyvinylchlorides and related chlorinated olefins, acrylonitrile-butadiene-styrene (ABS) and poly (ethylene terephthalate).

BRIEF DESCRIPTION OF THE DRAWINGS

The invention will become more apparent from the following detailed specification and drawings in which.

DESCRIPTION OF PREFERRED EMBODIMENTS

The invention provides the addition of preceramic polymers to plastics to reduce the flammability thereof. That is, the use of preceramic inorganic, hybrid (organic-inorganic) and organometallic polymers as additives and in blends with organic polymers reduces polymer flammability without any of the above problems. Typical preceramic polymers such as polysilsesquioxane (PSS) resins and polycarbosilane copolymers (PCS) were blended with common organic polymers such as polypropylene, Kraton™ (polystyrene-polybutadiene-polystyrene, SBS) and Pebax™ (a polyether block-polyamide copolymer), including polytetramethylene ether-nylon copolymer). The typical Pebax™ blends exhibit 50% to 70% lower peak heat release rate (HRR) than pure Pebax™ without significantly increasing the smoke or carbon monoxide levels during the combustion. HRR has been shown to be the most important parameter to consider for evaluation of the Fire-Safety of materials. The HRR data for the Pebax™ and the Pebax™ blends is shown in FIG. 1.

Figure 1:
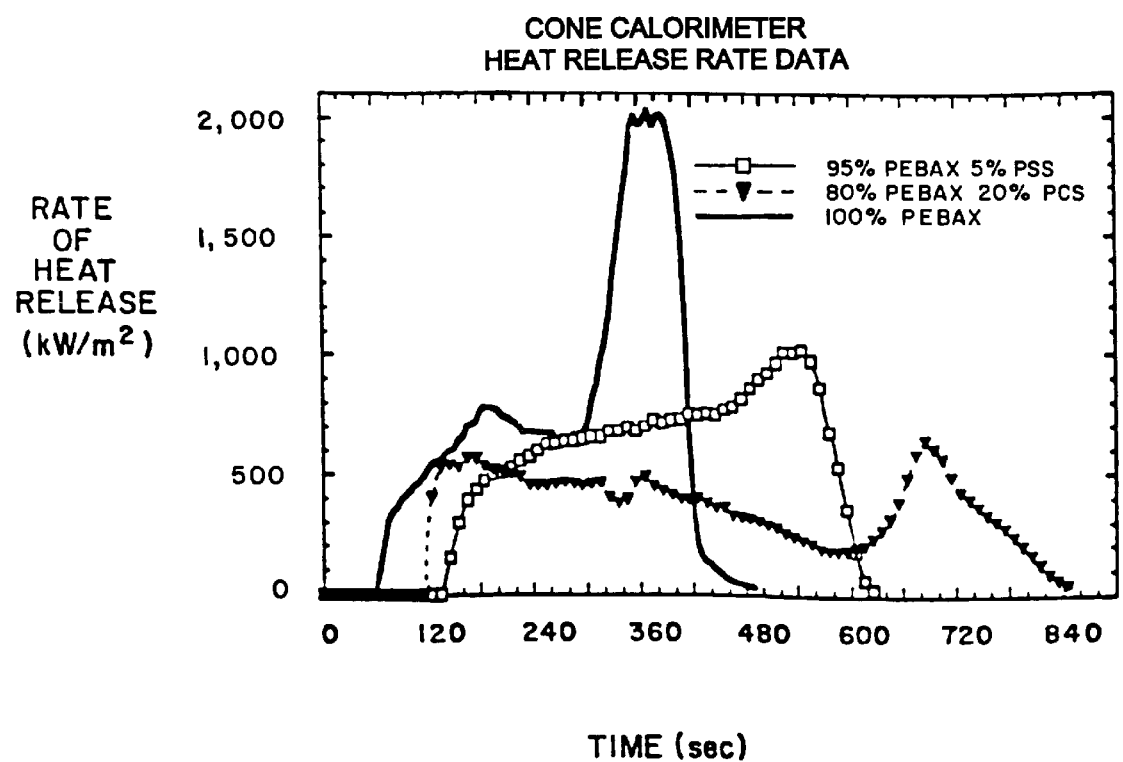
FIGS. 1, 2 and 3 are graphs relative to heat release of various polymer blends with and without FR additives
Figure 2:
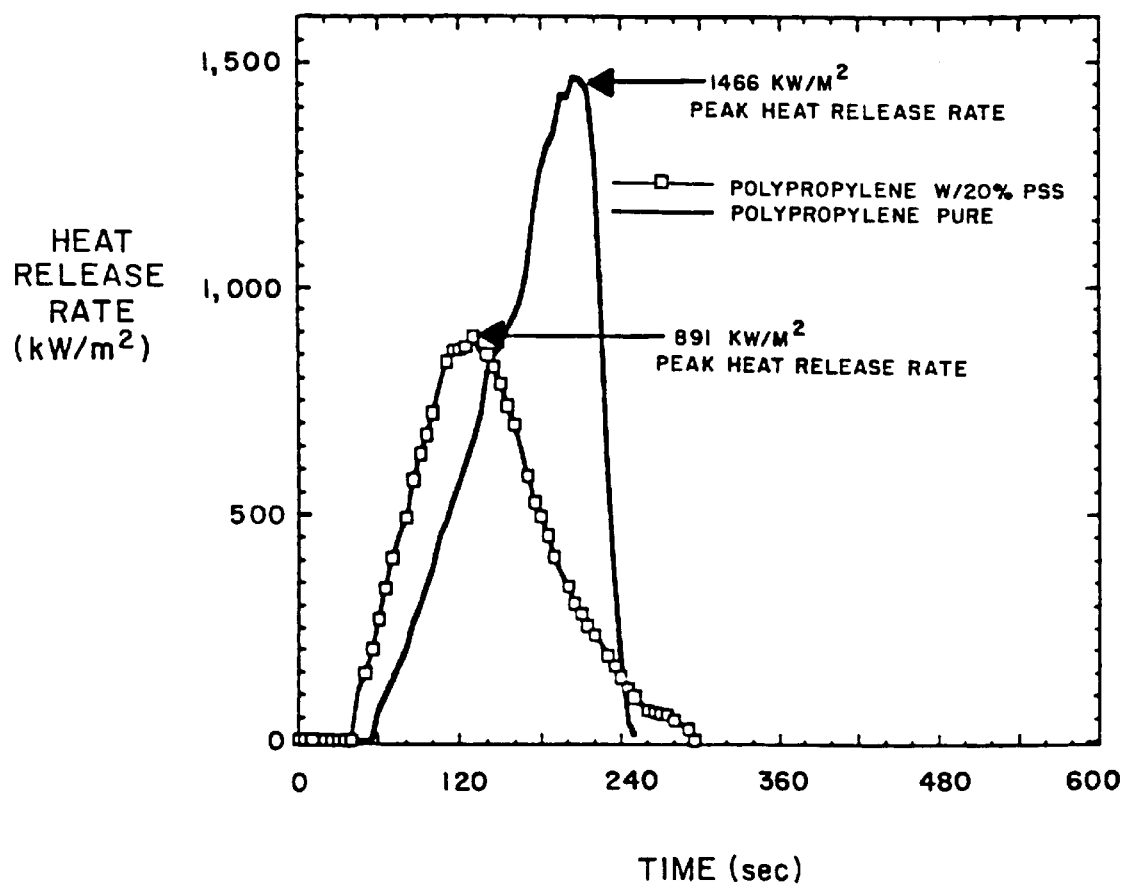

FIG. 1 shows heat release rate (HRR) data for Pebax, a Pebax/20% PCS blend and a Pebax/5% PSS blend. Per the graph, such data shows a 50% to 70% reduction in the maximum peak HRR and a 100% increase in the ignition time for the blends. The HRR data for polypropylene and polypropylene blended with PSS is shown in FIG. 2 and the HRR data for Kraton™ (a styrene-butadiene-styrene triblock polymer), Kraton blended with PCS and PSS respectively, shown in FIG. 3, reveal similar flammability performance advantages using this new FR approach.

That is. FIG. 2 shows the heat release rate (HRR) data for polypropylene and a polypropylene/20% PSS blend.

Figure 3:
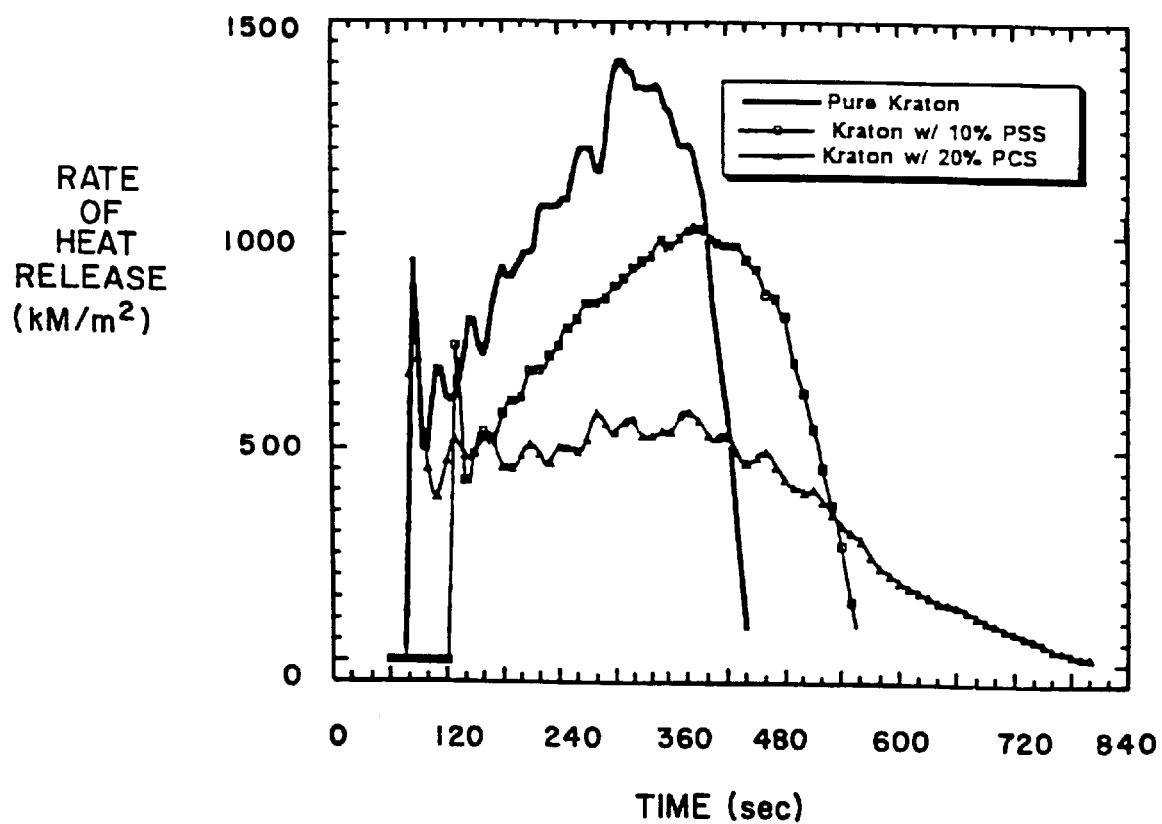

Also in FIG. 3, the HRR data is plotted for pure Kraton, Kraton/10% PSS blend and Kraton/20% PCS blend. This data shows a 30% to 40% reduction in the peak HRR for the blends. Table 1 shows a more complete set of combustion data for these systems. These blends do not produce toxic compounds such as dioxins and dibenzofurans during the burning as some halogen base fire retardants are alleged to. They also do not increase the amount of carbon monoxide or smoke during the combustion. The mean extinction area and CO yield data in Table 1 show that the average CO and smoke produced on combustion are not significantly increased upon addition of the preceramic materials. Additionally and of significant importance, the preceramic component serves to reduce the overall mass loss rate from the blend during combustion. This reduced mass loss rate results in lowering the rate of smoke and CO evolved during combustion of the blended materials as compared to that of the pure polymer.

The data in Table 2 show that the blending of the preceramic polymers can also be used to tailor the mechanical properties of commercial resins. For example the moduli and char yield of these polymer blends can be selectively controlled over a wide range. An additional improvement derived from these systems is that the melt viscosity of the mixtures is higher than that of the pure polymers due to the high melt viscosity of the preceramic polymers. The melt viscosity effect combined with the encapsulating effect of the ceramic char, formed during the burning, reduces dripping during flammability tests such as UL 94 and improves the flammability rating. Furthermore the high melt viscosity increases the thickness and therefore the performance of the char layer that forms as the preceramic decomposes.

Cone combustion data for polymers and preceramic polymer-polymer blends are shown in Table 1 below.

Thus the inventive approach to developing fire-safe thermoplastic hybrid materials takes advantage of the char forming properties and thermal properties of available preceramic materials, e.g. polycarbosilanes (PCS), polysilanes (PS), polysilsesquioxane (PSS) resins, polyhedral oligomeric silsesquioxane (POSS) monomers, polymers and copolymers, examples of which are shown below.

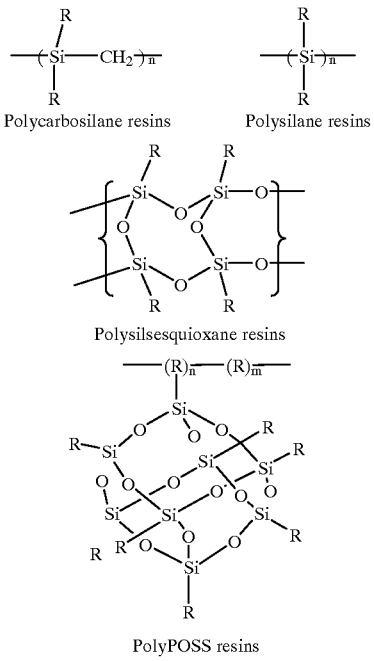

In such formulas R=H or alkane, alkenyl or alkynl hydrocarbons, cyclic or linear, with 1–28 carbon atoms, substituted hydrocarbons R—X, Aromatics Ar and substituted aromatics Ar—X where X=halogen, phosphorus or nitrogen containing groups. The incorporation of halogen or other inorganic groups such as phosphates and amines directly onto these polymers can additionally afford a "dual" fire-retardancy. Dual fire-retardancy can be achieved by the

TABLE 1

| Sample | Char Yield (%) | Peak HRR (Δ%) (kW/m²) | Mean HRR (Δ%) (kW/m²) | Mean Heat of Combustion (MJ/kg) | Total Heat Released (MJ/m²) | Mean Ext. Area (m²/kg) | Mean CO yield (kg/kg) |
|---|---|---|---|---|---|---|---|
| PP | 0 | 1,466 | 741 | 34.7 | 141 | 650 | 0.03 |
| PP w/20% PSS | 17 | 892 (40%) | 432 (42%) | 29.8 | 106 | 821 | 0.03 |
| PEBAX ™ | 0 | 2,020 | 780 | 29.0 | 332 | 187 | 0.02 |
| PFBAX ™ w/20% PCS | 15 | 699 (65%) | 419 (46%) | 28.5 | 272 | ' 260 | 0.02 |
| PEBAX ° w/10% PSS | 6 | 578 (72%) | 437 (44%) | 25.2 | 301 | 367 | 0.02 |
| Kraton ™ | 1 | 1,405 | 976 | 29.3 | 351 | 1,750 | 0.08 |
| Kraton ™ w/20% PCS | 20 | 825 (42%) | 362 (63%) | 26.4 | 266 | 1,548 | 0.07 |
| Kraton ™ w/10% PSS | 6 | 1,027 (27%) | 755 (23%) | 26.9 | 324 | 1,491 | 0.07 |

These new fire retardants can be used with commodity and engineering polymers in any application where a fire retarded polymer is required, i.e., carpeting, adhesives, wire and cable insulation and jacketing, fabrics, furniture, structural plastics, chassis, housings etc.

substituent group controlling the gas-phase combustion chemistry and or contributing to the formation of char and hence controlling the solid-state chemistry.

The above R substituents on the preceramic polymer of the invention, aid in compatabilizing the preceramic polymer with the organic/resin polymer (as indicated in Table 2. hereof). In some cases, the substitutents can aid in improving the char-forming characteristics and in lowering the heat release from the resulting formulation (per the dual fire retardancy noted above).

These polymers can also contain termination points (chain ends) containing reactive or nonreactive functionalities such as silanols, esters, alcohols, amines or R groups as listed above.

The above formulas are representative of the type of blendable preceramic polymer resins employed as additives and in blends with organic polymers for reducing flammability, ie. as a fire retardant for commodity and engineering polymers, per the invention.

The mechanical properties of preceramic polymers are often not sufficient to allow their application alone as engineering plastics. However, these preceramic materials can be blended in various proportions with thermoplastics such as polypropylene (or other polyolefins or nylons, polyethers, polyesters) and thermoplastic elastomers such as PEBAX™ (a polyether block-polyamide copolymer) or Kraton™ (a styrene-butadiene-styrene triblock polymer). The resulting "preceramic polymer-organic polymer" blends have been shown to possess mechanical properties desirable for many engineering applications along with enhanced resistance to combustion and low heat release upon combustion.

Physical properties for preceramic polymer-engineering polymer blends are listed in Table 2 below.

An additional benefit of this approach is that since such a wide variety of structures exist for preceramic polymers that an optimal match can be achieved between the preceramic polymer and the organic polymer, allowing optimization of performance for a particular organic polymer. For example PCS appears to be the best preceramic to use for controlling the flammability of non polar polymers like Pebax without sacrificing the desirable range of mechanical properties. In a more polar type organic polymer a preceramic, such as a PSS, with the appropriate level of silanol groups would make a stable high quality blend through favorable (compatibilizing) hydrogen bonding interactions.

The process of blending preceramic polymers with organic polymers enables control over the amount of char formed during combustion. It is the formation of this char that is the key to the FR of these polymer blends. Char formation reduces the amount of small volatile polymer pyrolysis fragments, or fuel, available for burning in the gas phase; this, in turn reduces the amount of heat released and feedback to the polymer surface. The char accomplishes this by insulating the underlying virgin polymer from the external combustion radiation, and/or by trapping decomposition products in it's matrix. It may also re-radiate energy away from the polymer. The physical structure of the char is important in these roles. Foamy char structure appears to be more fire resistant than brittle, thin char. This char enhancing approach is most successful when the polymer chars rapidly and early in the burning process. To be useful the charring process must be designed so that it occurs subsequent to the processing temperature and early in the decomposition of

TABLE 2

| Material | Pk. Stress | Brk. Strain | Yng. Mod. | Melt Temp. | Char yld |
|---|---|---|---|---|---|
| PEBAX/PCS | | | | | |
| 80/20 | 2313 psi | 7.0 in/in. | 1894 psi | 118 C | 18% |
| 50/50 | 733 | 0.67 | 8333 | 125 | 44 |
| 30/70 | 1022 | 0.10 | 46830 | 216 | 56 |
| 20/80 | — | — | — | 200 | 69 |
| PEBAX/PS | | | | | |
| 80/20 | 2210 | 9.4 | 745 | 118 | 15 |
| 50/50 | 448 | 3.8 | 2253 | 110 | 43 |
| 30/70 | 280 | 5.9 | 5021 | 73 | 43 |
| 20/80 | 194 | 1.2 | 15530 | 52 | 50 |
| PS | — | — | — | 148 | 79 |
| PCS | — | — | — | 199 | 74 |
| PEBAX | 2778 | 8.2 | 617 | 119 | 2.0 |

PS = a polysilane copolymer containing $(PhSiMe)_{50}(SiMe_2)_{50}$. Char yields determined by thermogravimetric anaylsis under nitrogen.

As shown in Table 2, the mechanical properties (tensile strength, elongation, Youngs modulus) of the resulting polymer blends can be tailored over a wide range and are dependent upon the percentage of the preceramic incorporated.

The thermal properties (such as melt and glass transitions) of the resulting blends are similarly controlled through the percentage of preceramic polymer incorporated into the blend composition. Control over the thermal properties of plastics is desirable for enabling the material to be amenable to a variety of plastic fabrication processes (such as compression molding, extrusion, injection molding, and spraying technologies). The flammability properties (such as ignition time, and HRR) of the resulting blends are similarly controlled through the percentage of preceramic polymer incorporated. Therefore the amount of flame retardancy required for a particular application can easily be selected.

the polymer, i.e., $T_{processing} \ll T_{charring} \sim T_{decomp}$. Additives that increase the amount of charcoal-like residue or carbonaceous char that forms during polymer combustion can be very effective fire retardants.

Figure 4:
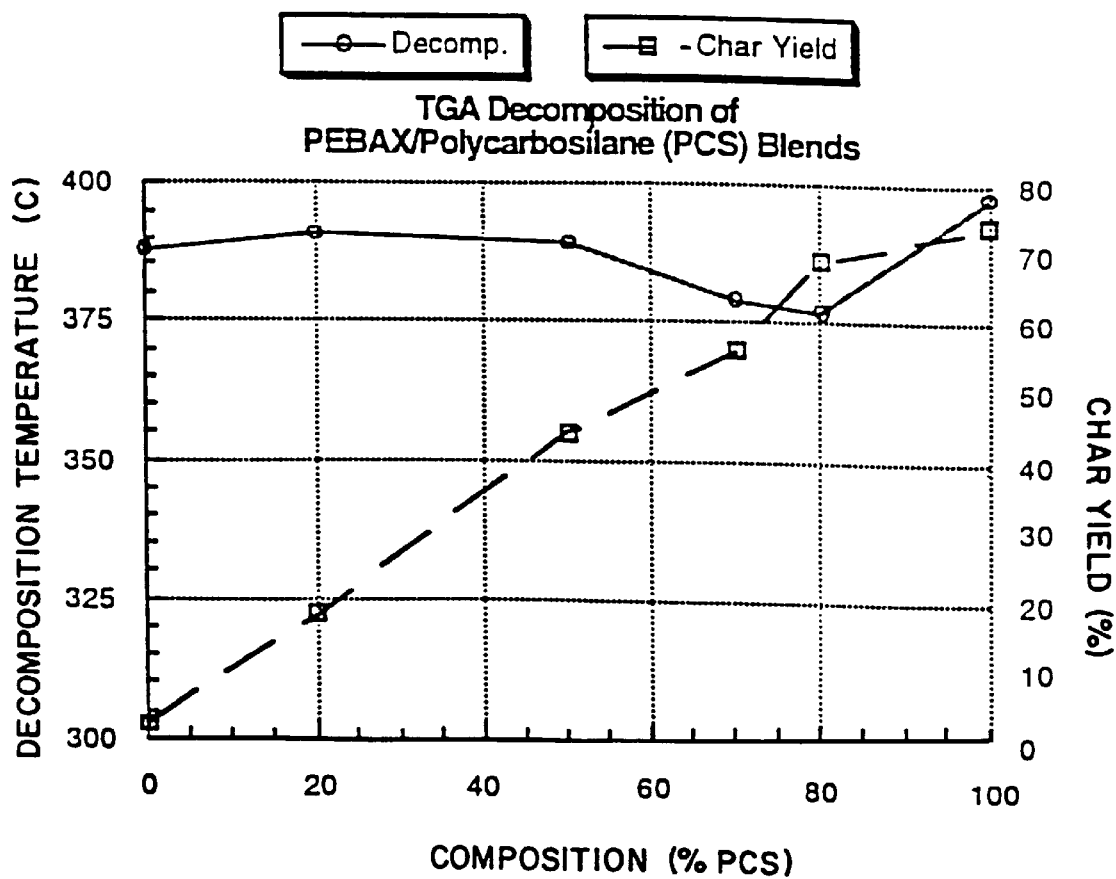
FIG. 4 is a decomposition temperature and char yields graph for a preceramic polymer blend of the present invention.

In added support that control over char formation can be achieved via blending preceramic and organic polymers, FIG. 4 shows that the amount of char formed during pyrolysis increases as the proportion of preceramic polymer blended with the engineering polymer is increased. That is, FIG. 4 shows the decomposition temperature and char yields for a preceramic polymer-engineering polymer blend. In this case the engineering polymer does not contribute to char formation. Combinations of preceramic polymers and organic polymers can be envisioned in which the organic polymer component also combines, in a synergistic manner, with the preceramic component to enhance char formation. In example we refer to the Kraton™ w/ 20 wt % PCS blend in Table 1. In this case the ceramic char from the preceramic polymers appears to increase the amount of carbonaceous char to produce a superior insulation barrier and decreases the amount of fuel for combustion in the gas phase.

The following example is given in illustration of the present invention and should not be construed in limitation thereof.

EXAMPLE I

Blends of polycarbosilane or polysilastyrene with "Pebax" or "Kraton" were prepared with preceramic weight fractions of 0.8, 0.7, 0.6, 0.5, and 0.2. Both components of the blend were weighed into a reactor followed by the addition of dichloromethane and tetrahydrofuran. The mixture was heated to the boiling point of the solvent while being mixed with a high shear emulsifier. The solution was poured into a Teflon mold and the solvent was evaporated for 24 hours at room temperature, then under vacuum at 80° C. for 12 hours. The polymer blends were then hot pressed to make flat sheets for sample analysis. In the manner described in U.S. Pat. No. 5,484,867 (1996) to Lichtenhan et. al, incorporated herein by reference. The results or properties of the sheets so analyzed are shown in Tables 1 and 2 above.

Blend preparation without the use of solvents and swelling agents is also possible through the use of dispersive melt mixing equipment such as Bandbury™ mixers or twin screw extruders.

The process disclosed herein is not in any way limited to the specific materials used or the processes described to prepare and enable them to function as FR plastics. For example FR preceramic polymer-polymer blends can be prepared using reactive processing techniques that enable or enhance the homogeneity (mutual compatibility and/or miscibility between the preceramic polymer and organic polymer). Likewise, non homogeneous preceramic polymer-polymer blends (mixtures of preceramic polymers and organic polymer showing incompatibility, immiscibility and phase separation) can be prepared and employed as effective FR plastics.

That is, the preceramic polymers of the invention are enabling components to be blended with common hydrocarbon-based plastics (eg. organic polymers) and that these materials can function as FR plastics.

Per the invention, the above preceramic polymers can be blended with the above plastics in a ratio of 1–80 wt % of the preceramic to the combined weight of preceramic and plastic. Suitably the above ratio can be 1–50 wt % and/or 62–80 wt %. Preferably such ratio is 5–28 wt % and more preferably 5–25 wt %.

The above fire-safe plastics of the invention can be used in any application where improvement of the fire safety of plastics is desired. This includes carpeting, adhesives, wire and cable insulation and building & vehicle interiors. These materials have application in rocket and space vehicle systems as lightweight and low cost structural and thermal components. These materials also have application in aircraft systems as fire-safe plastics for structural and comfort applications and as insulators.

The above preceramic polymers and organic polymers which form the FR blends of the invention, are generally of thermoplastic and thus can be recycled and re-thermoformed (molded) into other finished articles.

What is claimed is:

1. A method for enhancing the fire resistivity of plastics comprising adding at least one preceramic polymer to at least one organic plastic to reduce the flammability thereof and form a polymer-plastic blend, wherein said preceramic polymer is selected from the group of polysilsesquioxane (PSS) resins and polyhedral oligomeric silsesquioxanes (POSS) monomers, polymers and copolymers.

2. The method of claim 1 wherein the ratio of preceramic polymer/blend is 1–80 wt %.

3. The method of claim 1 wherein the ratio of preceramic polymer/blend is 1–50 wt %.

4. The method of claim 1 wherein the ratio of preceramic polymer/blend is 62–80 wt %.

5. The method of claim 1 wherein the ratio of preceramic polymer/blend is 5–28 wt %.

6. The method of claim 1 wherein the ratio of preceramic polymer/blend is 5–25 wt %.

7. The method of claim 1 wherein the ratio of preceramic polymer/blend is 5–20 wt %.

8. The method of claim 1 wherein said organic polymer is selected from the group of polystyrene, polypropylene, polycarbonate, polyamide, poly(butylene terphthalate), poly (ethylene terphtalate), a polyether block-polyamide copolymer, a styrene-butadiene-styrene triblock polymer, SBS and polyolefin.

9. The method of claim 1 wherein said preceramic polymer is added to improve the char-forming characteristics of polystyrene, polypropylene, polycarbonate, polyamide, poly (butylene terphthalate), poly(ethylene terphtalate), a polyether block-polyamide copolymer, a styrene-butadiene-styrene triblock polymer, SBS and polyolefin.

10. The method of claim 1 wherein said preceramic polymer has at least one R—Si unit therein, where R=H, alkane, alkenyl or alknyl, cyclic or linear with 1–28 carbon atoms and where one or more Rs can be substituted hydrocarbons, R—X, aromatics, Ar and sustituted aromatics, Ar—X, where X=halogen, phosphorous or nitrogen containing groups of primary secondary and tertiary amines and ammonium salts thereof, imides and nitrites for dual fire retardency.

11. A method for enhancing the fire resistivity of plastic products comprising,
  a) adding at least one preceramic polymer to at least one organic plastic to reduce the flammability thereof and form a polymer-plastic blend, wherein said preceramic polymer is selected from the group of polysilsesquioxane (PSS) resins and polyhedral oligomeric silsesquioxanes (POSS) monomers, polymers and copolymers and
  b) incorporating said blend into said products which are selected from the group of carpeting, adhesives, wire, cable, insulation and building & vehicle interior materials.

12. A method for enhancing the fire resistivity of plastics comprising, adding preceramic polymers selected from the group of polysilsesquioxane (PSS) resins and polyhedral oligomeric silsesquioxane (POSS) resins to organic plastics and mixing same to obtain a blend of reduced flammability.

13. The method of claim 12 wherein said polymers are mixed by means selected from the group of a mechanical mixer and an extruder fed by one or more screws.

14. The method of claim 12 wherein said organic plastics are thermoplastics.

15. A method for enhancing the fire resistivity of plastics comprising, blending preceramic polymers selected from the group of polysilsesquioxane (PSS) resins and polyhedral oligomeric silsesquioxane (POSS) resins with said plastics.

* * * * *